United States Patent

[11] 3,633,713

[72] Inventors: Joseph A. Marland;
Charles W. Hill, both of La Grange, Ill.
[21] Appl. No. 827,400
[22] Filed May 23, 1969
[45] Patented Jan. 11, 1972
[73] Assignee Marland One-Way Clutch Co., Inc.
La Grange, Ill.
Continuation-in-part of application Ser. No. 737,965, June 18, 1968, now abandoned. This application May 23, 1969, Ser. No. 827,400

[54] ONE-WAY SELF-ALIGNING TORQUE UNIT
3 Claims, 10 Drawing Figs.
[52] U.S. Cl. .................................................. 188/82.84, 192/45
[51] Int. Cl. ......................................................... F16d 63/00
[50] Field of Search ............................................. 188/82.8, 82.84, 264.1; 192/45, 45.1

[56] References Cited
UNITED STATES PATENTS
2,835,364 5/1958 Picard .......................... 192/45

Primary Examiner—George E. A. Halvosa
Attorney—Burmeister, Palmatier & Hamby

ABSTRACT: A one-way, self-aligning torque unit well suited for heavy duty on a vertical shaft subject to misalignment with respect to coacting torque applying structure. The unit comprises a one-way torque coupling and an alignment coupling integrated together for mounting on a vertical shaft and providing for compensation for misalignment of the shaft with reference to coating structure which applies torque to the shaft in only one direction through the assembly. Working parts of the alignment coupling and underlying working parts of the torque coupling are continuously bathed in flowing lubricant that descends through a succession of comating working parts all to the end that the unit will operate reliably for many years in locations where access for service is impractical. A reversible cam ring in the unit permits adaption of the unit to transmit torque to the shaft in either direction without structural modification of components of the unit.

Inventors
Joseph A. Marland
Charles W. Hill
By Burmeister, Palmatier & Hamby
Attorneys

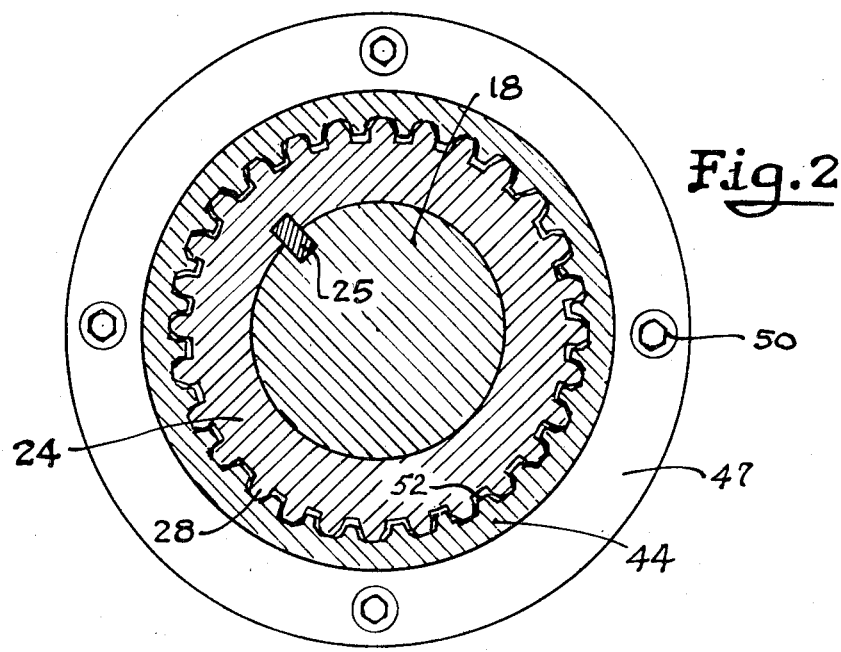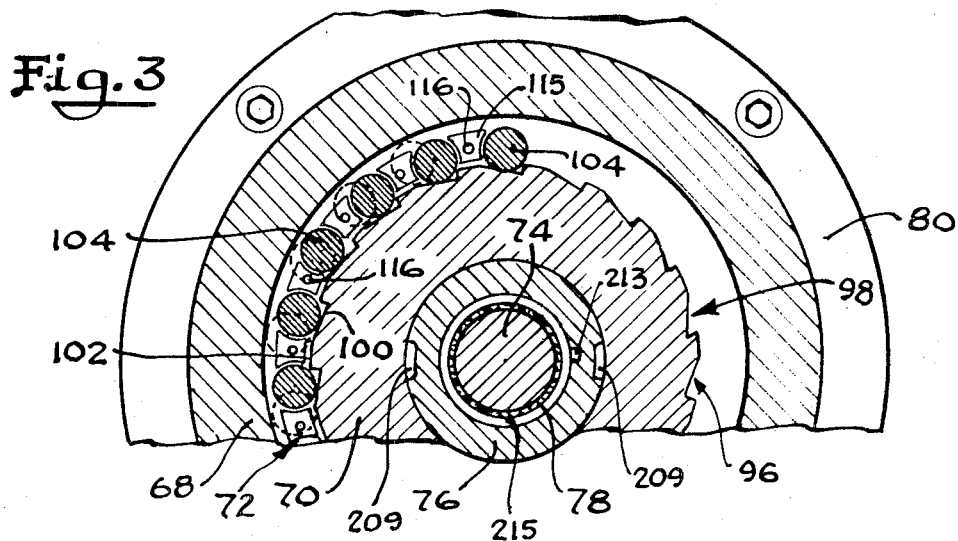

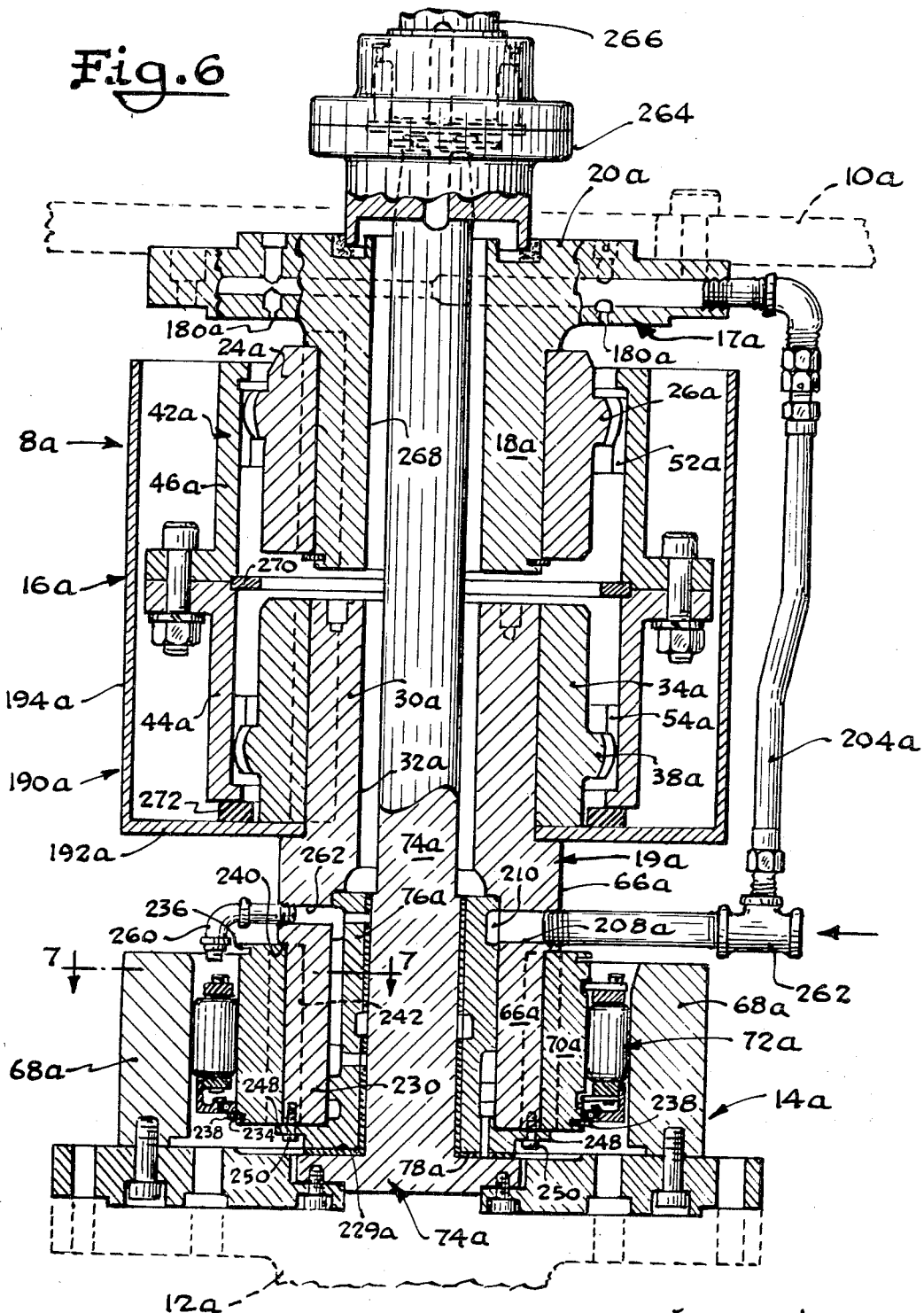

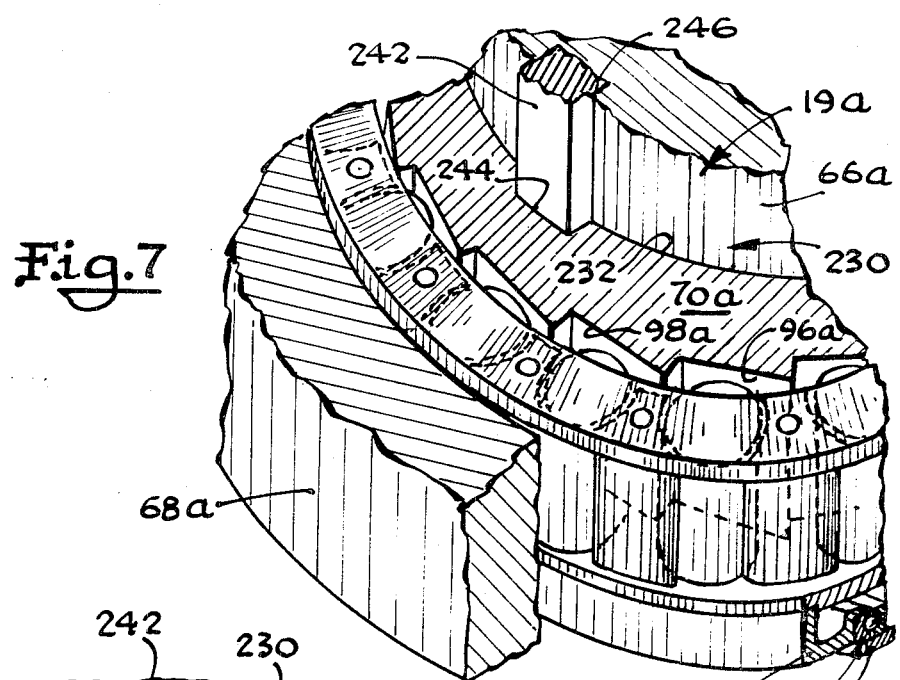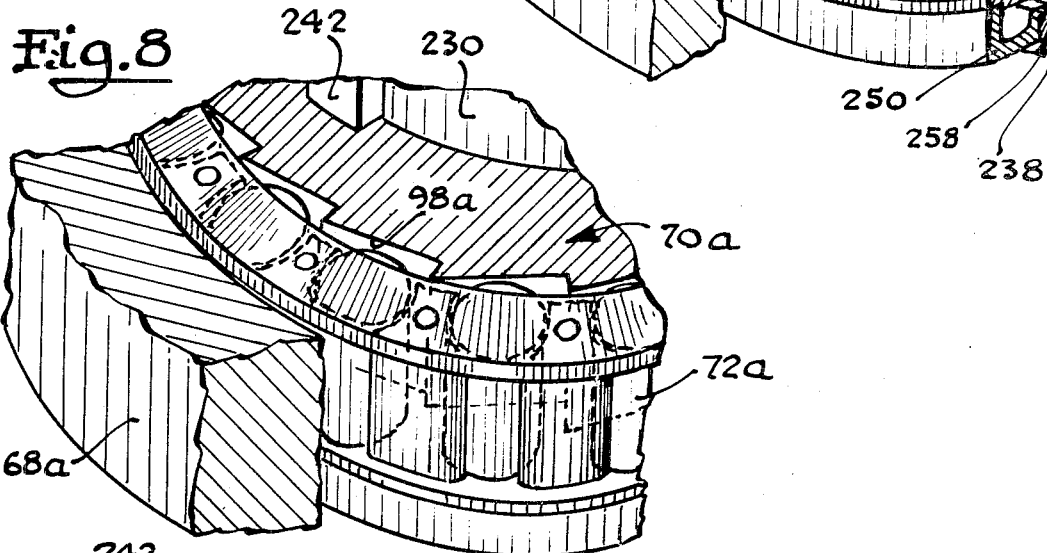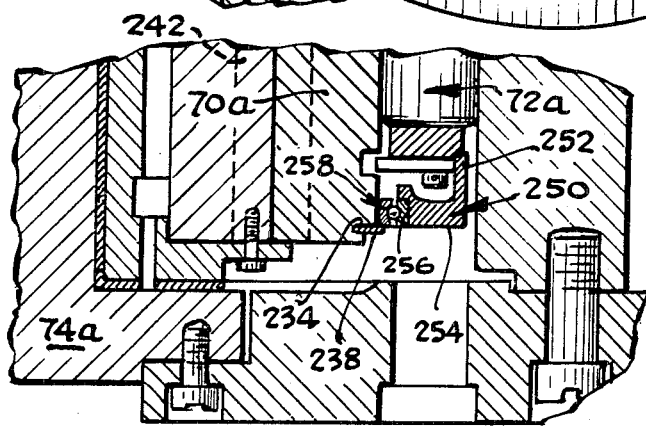

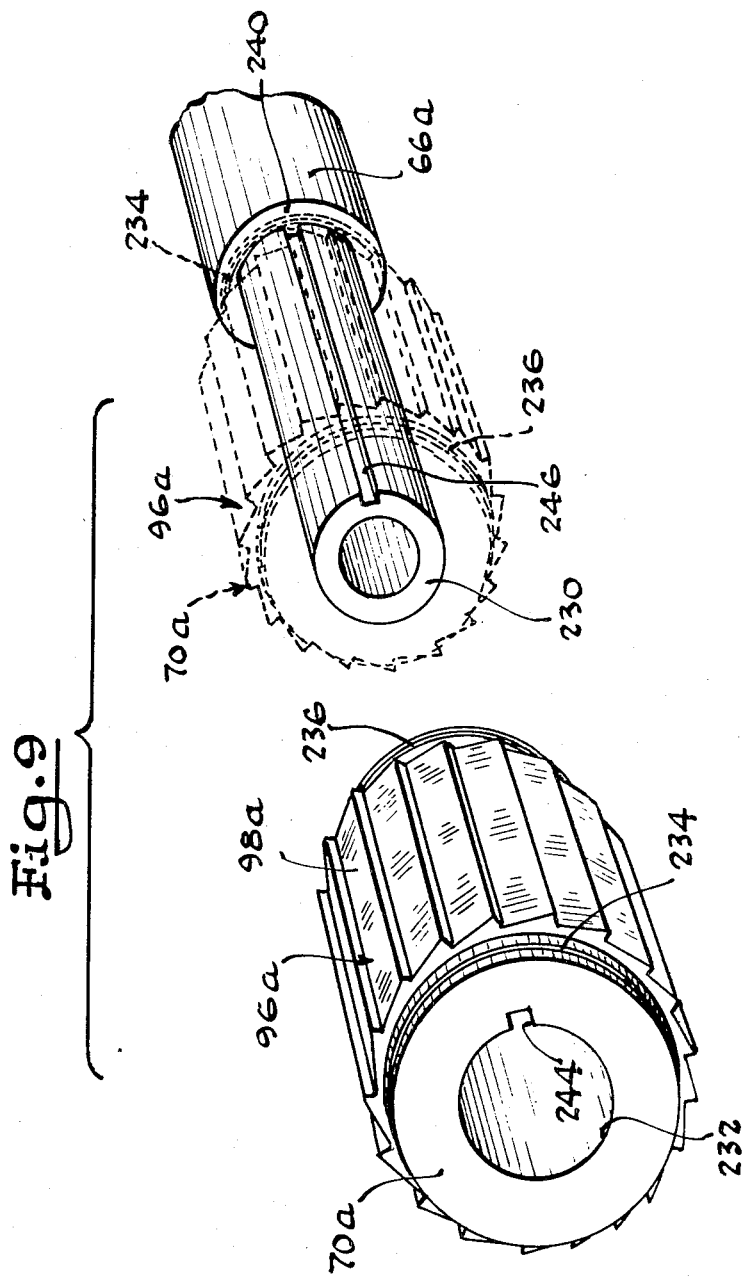

ONE-WAY SELF-ALIGNING TORQUE UNIT

This application is a continuation-in-part of copending application Ser. No. 737,965, filed June 18, 1968, now abandoned.

This invention relates to one-way torque couplings for rotatable shafts, and is concerned particularly with the control and operation by such couplings of vertical shafts subject to misalignment and located in environments where access for service is impractical.

One-way torque couplings are recognized mechanisms for limiting rotation of a rotatable shaft to one rotational direction, as clearly indicated by U.S. Pat. No. 2,865,474 by one of the present inventors, Mr. Joseph A. Marland, entitled "One-Way Automatic Backstops," and by Mr. Marland's U.S. Pat. No. 3,247,935 entitled "One-Way Brake Assembly and Seal Means Therefor." These patents disclose backstops in which a rotatable shaft is mechanically mounted on the inner race of a one-way coupling, the outer race of the one-way coupling being connected to a stationary structure by means of a beam extending normally from the axis of the shaft. The beam is affixed at one end to the structure and as the other end to the outer race of the coupling. The outwardly extending beam requires substantial lateral space.

One object of the invention is to provide, for applying torque to a shaft in one direction only, a one-way torque unit having a new and improved construction which minimizes the lateral size of the unit while at the same time providing an inherent capability for accommodating misalignment of the shaft in a manner which does not subject the unit to wear or strain with the consequence that an extremely long, trouble-free service life is obtained.

A further object is to provide a one-way, torque unit of the character recited that is especially well adapted for use on a vertical shaft in such manner that the unit is supported largely on the vertical shaft with consequent determination of the axial positions of major components of the unit, the unit comprising a one-way coupling adapted for support on a shaft and integrated with an alignment coupling supported on the one-way coupling and functioning at once to sustain the torque reaction of the shaft on the one-way coupling and to accommodate misalignment of the shaft.

A further object is to provide a one-way, self-aligning torque unit, as recited, having an improved construction which enables the unit to operate dependably in continuous use over a very long service life that may extend laterally for decades without repairs or service except for the supplying of lubricant which may be pumped into the unit.

A further object is to provide a one-way, self-aligning torque unit of the character recited having an improved and highly advantageous construction which facilitates support of the unit on a vertical shaft while at the same time utilizing a cascading flow of oil to a maximized advantage in assuring more advantageous lubrication of working parts comating on a plurality of levels in the unit.

Another object is to provide a one-way, self-aligning torque unit as recited in which concentricity of major components of a one-way torque applying mechanism in the unit is maintained in an advantageous manner.

Another object is to provide a one-way, self-aligning torque unit as recited in which alignment of an annular series of torque transmitting rollers with respect to inner and outer coacting races is maintained to advantage by a cage journaled on antifriction bearings.

Another object is to provide a one-way, self-aligning torque unit as recited which can be adapted, through assembly, without structural modification of its component elements to transmit torque to a coacting shaft in either desired direction.

Another object is to provide a one-way, self-aligning torque unit as recited which can function positively to preclude reverse rotation of the shaft while at the same time providing for driving of the shaft through the unit in the normal direction of shaft rotation.

Other objects and advantages will appear from the following description of the exemplary embodiments of the invention illustrated in the drawings in which FIG. 1 is a vertical sectional view showing in solid lines a one-way torque unit constructed in accordance with the invention and illustrating in phantom lines a housing to which the unit is anchored and a vertical turbine shaft to which the unit is attached;

FIG. 2 is a transverse sectional view of the unit taken along the line 2—2 of FIG. 1;

FIG. 3 is a fragmentary transverse sectional view taken with reference to the line 3—3 of FIG. 1;

FIG. 6 is a vertical sectional view similar to FIG. 1 but illustrating a modified embodiment of the invention;

FIG. 7 is a fragmentary perspective view on an enlarged scale taken with reference to the line 7—7 of FIG. 6;

FIG. 8 is a fragmentary sectional view similar to FIG. 7 but showing the inner race reassembled on its support in a reversed position to transmit torque to the shaft in the opposite direction;

Figure 1:
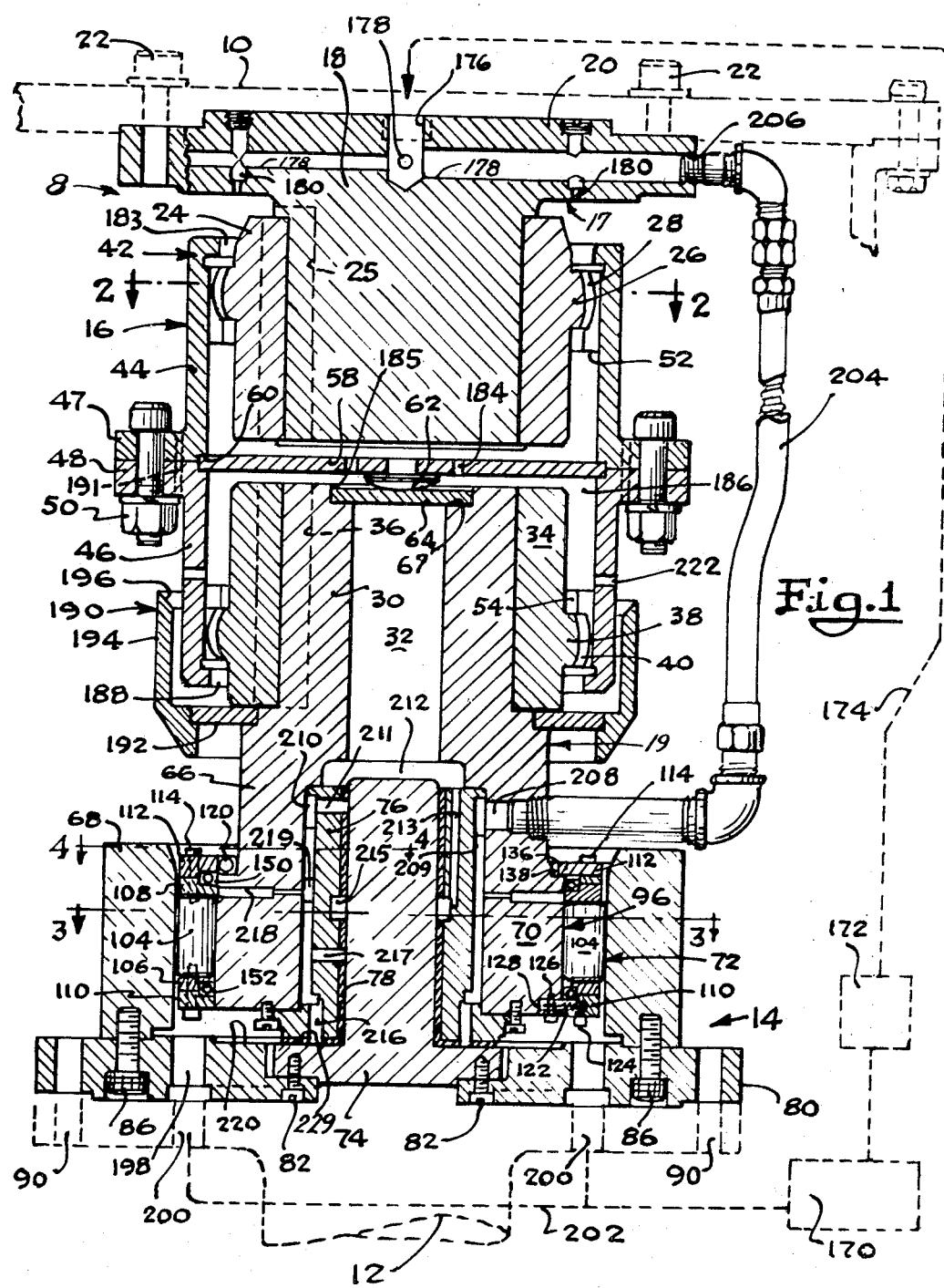

FIG. 8A is a fragmentary sectional view on an enlarged scale corresponding to the lower right-hand portion of FIG. 6; and FIG. 9 is a perspective view showing in solid lines the inner race and its support in exploded relation to each other and illustrating in phantom lines the position of the race when reversed and assembled onto its support to adapt the unit to transmit torque in the opposite direction.

Referring now to the drawings, the one-way self-aligning torque unit 8 forming the first illustrated embodiment of the invention, FIGS. 1 to 5, functions as a backstop mechanism for preventing reverse rotation of a coacting shaft. The unit 8 is anchored to the cover plate 10 of a stationary housing and connected to the upper end of a vertically disposed shaft 12 of an installation, which is to be controlled by the backstop. The unit 8 comprises a shaft misalignment coupling 16 which couples a one-way torque coupling 14 of the unit to the housing cover plate 10. The shaft 12 may be of any vertical shaft, especially a relatively high speed shaft, mounted on any type of installation.

The one-way torque unit 8 serves as a particularly useful backstop mechanism to prevent reverse rotation of one of a plurality of centrifugal pumps utilized to deliver a liquid coolant, such as water, to cool a nuclear reactor. An efficient and reliable backstop mechanism is particularly required for such installations because in the event of motor shut down or failure of one of the pumps the hydraulic head of water from the other pumps would reverse the rotor of the failing or shut down pump and lead to runaway speeds which could result in centrifugal explosion of the motor or the pump rotor. Such a breakdown leads to hazards of possible radioactive contamination from the nuclear reactor. A backstop mechanism of the type disclosed is rugged and reliable and may be left unattended for many years when used with such nuclear reactor.

The shaft misalignment coupling 16 allows the components of the one-way torque coupling 14 to adjust concentrically to a true geometric center of the vertical pump or motor shaft 12, and such adjustment is attained whether the shaft 12 is rotating or is static. The coupling 16 includes an upper or first coupler 17 secured to the cover plate 10, and comprising a centrally located stub shaft 18 having an upper flange 20 secured to the cover plate 10 by bolts 22. A geared hub 24 is keyed to the stub shaft 18 by a key 25 and has a radial gear 26 comprising an annular series of crowned male gear teeth, 28, FIGS. 1 and 2.

A lower or second coupler 19 is positioned immediately below the first coupler 17, and this second coupler is carried by the one-way coupling 14. The second coupler 19 comprises a centrally located body shaft 30 having a centrally disposed passage 32 and forming an integral component of the one-way coupling 14 as will presently appear. A geared hub 34 is keyed to the shaft 30 by a key 36 and has a radial gear 38 having an annular series of crowned gear teeth 40.

A cylindrical coupler sleeve 42 spans and engages the upper and lower couplers 17, 19. The sleeve 42 has an upper wall part 44 and a lower wall part 46 which have respectively circular protruding flanges 47 and 48 that are joined by a plurality of bolt and nut assemblies 50. The upper and lower parts 44, 46 have respectively internal annular gears 52 and 54, each of which has straight cut gear teeth.

The common coupler sleeve 42 is supported on the one-way coupling 14 by thrust member or plate 58 which is secured to and seated in a continuous peripheral groove 60 in the inside wall of the common coupler sleeve 16 at the junction of the parts 44 and 46. The thrust plate 58 has a centrally located depending thrust button 62 which bears against a smaller thrust plate 64 mounted in an annular groove 67 on the upper end of the shaft 30. The weight of the coupler sleeve 42 is transferred by the button 62 to the thrust plate 64 and hence to the shaft 30.

The one-way coupling 14 is coupled to the lower coupler 19 of the alignment coupling 16 through a body portion 66 of the shaft 30 which extends from the lower coupler 19 to an inner race 70 of the one-way torque coupling 14. The torque coupling 14 has an outer race 68 which concentrically encircles the inner race 70 as shown. Disposed between the inner and outer races 70, 68 is a roller assembly 72.

It will be noted that in the construction described the upper and lower couplers 17, 19, the common sleeve 42, the shaft 30, and inner race 70 are all attached to the stationary cover plate 10 and are stationary. The outer race 68 and its related mechanism rotate with the shaft 12.

Precise alignment of the inner and outer races 70, 68 is assured by a centering spindle 74 mounted on the outer race 68 and journaled within the inner race 70. The centering spindle 74 is coaxially disposed relative to the inner and outer races 70. 68 and to the shaft 12. The inner race 70 is mounted on a coaxial bearing 76 which has a layer of bearing material 78 that journals the spindle 74. A drive plate 80 is secured to the centering spindle 74 by screws 82 and is secured to the outer race 68 by screws 86. The rotatable shaft 12 is secured to the drive plate 80 by bolts (not shown) which extend through aligned bores 90 in the shaft 12 and drive plate, FIG. 1.

When the one-way torque coupling 14 is in free wheeling operation, the shaft 12, drive plate 80, centering spindle 74, and outer race 68 rotate as a unit. The inner race 70 does not rotate. Movement of the alignment coupling 16 in the installation described is limited to working of the parts to accommodate misalignment of the shaft 12.

The inner race 70 has a cammed peripheral surface 96, FIGS. 1 and 3. This peripheral surface of the inner race has a plurality of spaced indentations 98 each of which has a low surface or edge 100 and a high surface or edge 102.

The roller assembly 72 is mounted on the inner race 70 and includes a plurality of rollers 104 which are movable between the low and high surfaces 100, 102, the rollers 104 moving toward the low surfaces or edges 100 during free wheeling operation. The rollers 104 move toward the high surfaces or edges 102 as an incident to incipient reverse rotation of the shaft 12 to become wedged between the inner race 70 and outer race 68 to lock the shaft against reverse rotation.

The rollers 104 of the roller assembly 72 are caged between two rings 106 and 108 having respectively adjoining support rings 110, 112 secured to the sides thereof away from the rollers. The rings 106 and 110 are fastened together by screws 114, FIG. 5, to form a first ring member and the rings 108 and 112 are secured together to form a second ring member of the cage. Adjacent rollers 104 are spaced apart by a spacer member 115 disposed between each pair of adjacent rollers, each spacer member 115 having conforming concave sides confronting the adjacent rollers and being secured on the ring members by pins 116 which extend through the spacer members 115.

The roller assembly 72 is spring biased by a pair of springs 120 and 122 on opposite sides of the radial axis of the inner race and extend between the rings 110 and 112 and the inner race 70, respectively. The spring 120 is anchored at one end to ring 110 and at the other end to the inner race 70. In like manner, FIGS. 4 and 5, the other spring 122 extends through an elongated slot 125 in the cammed surface 96 in the inner race 70. The slot 125 communicates with a slotted pocket 125a of smaller width in the inner race 70 and one end of the spring 122 is secured to the inner race 70 by a screw 126 which passes through the pocket 125a and engages a tapped bore 129 in the body of the inner race 70. The other end of the spring 122 is secured in an arcuate slot 131 extending into the ring 112. This end of the spring 122 is secured to the cage ring 112 by a screw 124 which passes through slot 131 into a tapped bore 132 in the ring 112. The springs 120, 122 urge the cage in the direction to move the rollers 104 towards the raised edges 102 of the cams and insure early and concurrent engagement of the rollers 104 between the inner race 70 and the outer race 68 in response to incipient reverse rotation of the shaft 12.

Figure 4:
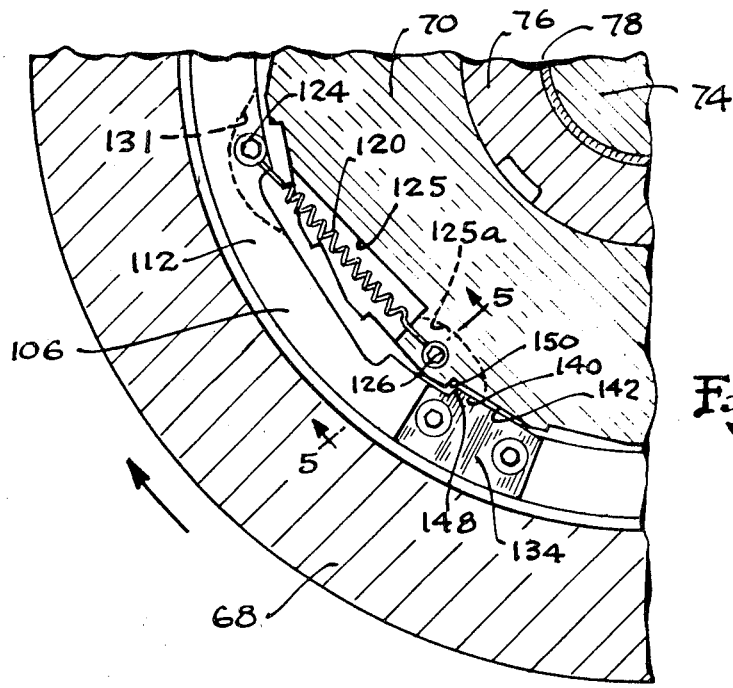
FIG. 4 is a fragmentary sectional view on an enlarged scale taken along the line 4—4 of FIG. 1.

The roller assembly 72 also includes at least one stop lug 134 disposed in each of the rings 106 and 108, FIG. 4. The stop lug 134 has an inwardly extending portion 140 which extends into slot 142 in the inner race 70. Each lug has a tooth portion 148 adapted to abut an adjacent ledge 150 on the inner race 70 intervening between the inner and outer edges 100, 102 of two adjacent indentations 98 in the inner race. The stop lugs 134 are a part of the rings 106 and 108 and limit the distance which the rollers 104 can move toward the inner edges 100 of the indentations 98 to keep the rollers from abutting the inner race 70 at the raised edges 102 of the adjacent indentations 98 thereby eliminating friction.

The cage is also provided with a support ring 136 on the side of the plate 110 away from the rollers 104. The support ring 136 rests on an arcuate shoulder 138 to support the weight of the roller assembly and prevent axial movement.

Figure 5:
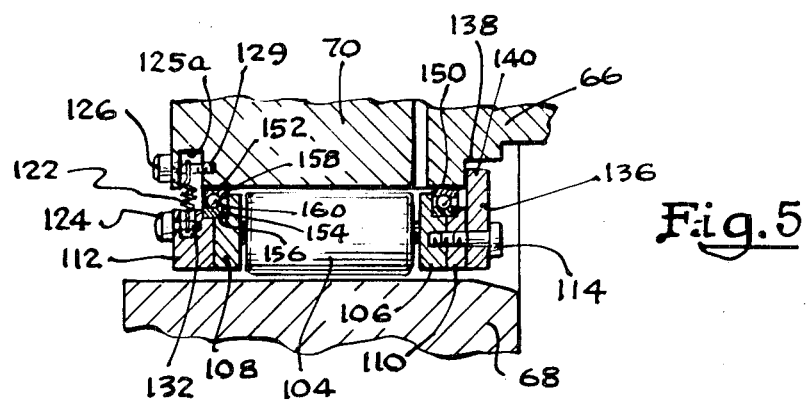
FIG. 5 is a fragmentary sectional view on an enlarged scale taken along the line 5—5 of FIG. 4.

In addition to the bearing surface formed by the support ring 136 and shoulder 138, the roller cage is supported by an upper ball bearing assembly 150 and a lower ball bearing assembly 152. As best illustrated in FIG. 5, each ball bearing assembly has an outer raceway 154 which is secured to and seated in a groove 156 formed in one of the end members of the cage. In particular, the outer raceway 154 of ball bearing assembly 152 is seated in adjoining portions of end ring 108 and plate 112. Each of the ball bearing assemblies 150, 152 has an inner raceway 158 abutting a cylindrical surface of the inner race 70. A plurality of ball bearings 160 are conventionally caged between the raceways 154 and 158 of each bearing assembly. As illustrated, the ball bearing assembly 150 is similarly secured between end ring 106, plate 110 and inner race 70.

The ball bearing assemblies 150 and 152 maintain the roller cage in radial alignment with the inner race 70. Thus, the ball bearing assemblies 150 and 152 prevent radial misalignment from causing a portion of the rollers 104 to abut the relatively high-speed metallic surface of the rotating outer race 68 in free wheeling, which would cause wobbling. This construction thus leads to prolonged life of the clutch elements in that physical contact is markedly reduced, during free wheeling operation, between the relative stationary elongated rollers 104 and the inner surface of the outer race 68.

An important feature of the one-way torque unit 8 described is the lubrication system which delivers lubricant to the bearing surfaces of the alignment coupling 16 and the underlying one-way torque coupling 14. The lubrication system has a source tank or reservoir 170, FIG. 1, from which liquid lubricant is delivered under pressure by a pump 172 into a line 174 and then to a lubricant entry or port 176 in the stub shaft 18 of the uppermost coupler 17. Entry 176 communicates with a plurality of transverse lubricant passageways 178, and a plurality of downwardly extending outlet ports 180 allow such drops of lubricant to fall onto the meshing gears 26 and 38 of the alignment coupling 16. The drops of liquid lubricant fall between the geared hub 24 and the upper part 44 on the common coupler sleeve 42.

The thrust member plate 58 receives excess lubricant from the relatively stationary gears 26 and 38 which floods the entire region between the upper wall part 44 and the geared hub 24, and overflows the upper end or lip 183 of the wall part 44. A small aperture 184 in the thrust plate 58 allows a few drops of the lubricant to fall on the thrust plate 64. The plate 64 is provided with a protruding ring 185 which retains a pool of lubricant about the thrust button 62. The lubricant overflowing the ring 185 flows into the space 186 between the hub gear 34 and the lower part 46 of the common coupler sleeve 42. The aperture 184 is sufficiently small in its cross-sectional area so that a sufficient body of lubricant is allowed to pool and flood the meshing gears of the upper coupler.

The lubricant moves through space 186 through opening 188 at the bottom of the common coupler sleeve 42 and then pools in a cup-shaped member or oil collector 190. The oil collector 190 receives lubricant overflowing the lip 183 of the coupler sleeve 42 from the space between the top coupler hub 24 and the upper common coupler part 44 and flowing through channels 191 formed in the flanges 47 and 48 in parallel relation to the axis of the coupler sleeve 42. The collector 190 has a bottom wall 192, which is normal to the axis of the spindle 30, and a continuous cylindrical sidewall 194 coaxial with the spindle 30 and provided with an inwardly tapering lower end. The lubricant floods the cup-shaped oil collector 190 and overflows the top edge 196, whereupon it flows down the wall 194 and drips on the roller assembly 72.

Thereafter the lubricant flows through the roller assembly 72 by gravity, lubricating it and the surfaces of the inner race 70 and outer race 68, before draining from the outlets 198 and 200 in the drive plate 80 and shaft 12, respectively. Such drained lubricant is returned to the reservoir 170 as indicated by dotted line 202, FIG. 1, but it is to be understood that an open container below the outlets 200, not shown, must be utilized to collect the liquid lubricant since the shaft 12 is rotating at high speed.

The foregoing lubrication system adequately and efficiently lubricates the bearing surfaces in the alignment coupling 16, but a further lubrication system is provided for delivering lubricant to the one-way torque coupling 14 and to the bearing surface of the spindle 74 to assure adequate and efficient lubrication thereof.

A conduit, such as a flexible metal conduit 204, is connected at one end, through coupler means, to outlet 206 of one of the transverse passageways 178. The other end of the conduit 204 is connected, through other coupler means, to an inlet 208 disposed in the body member 66. The inlet 208 communicates with a circular cavity 210 defined by the body member 66 and the confronting surface of the bearing member 76. The circular cavity 210 communicates with a plurality of depending passageways 209 in the body member, and also communicates with a plurality of upper transverse bearing passageways 211.

Lubricant flowing from the passageways 211 lubricates the surface between the spindle 74 and the layer of bearing material 78. A vertical passageway 213 communicates with a central circular cavity 215 which extends through the layer 78 of bearing material and into the body 66, and the passageway 213 communicates with a cavity 212 on the tope side of the spindle 74. The cavity 212 and passage 32 fill with oil due to the oil pressure between the spindle 74 and the layer 78 of bearing material, thus applying pressure against the upper surface of the spindle 74 and assuring a thick oil film between the bearing surfaces, the spindle 74 and the layer 78. A plurality of lower transverse passageways 217 extend between the vertical passageways 209 and the spindle 74 to convey lubricant from the vertical passageways 209 to the rotating bearing surface of centering spindle 74. Passageways 209 also communicate with inset vertical passageways 216 to allow lubricant to contact the horizontal surface 229 of the centering spindle 74, which surface must be adequately lubricated since it supports the weight of the inner race 70, roller assembly 72, and lower coupler assembly 19. The vertical passageways 209 also communicate with lateral passageways 218 which extend to the upper end of the roller cage to convey lubricant to the roller assembly 72. Lubricant flows downward over the roller assembly 72 and collects in a circular recess 220 disposed about the spindle 74, which also receives lubricant from the bearing surfaces between the spindle 74 and layer 78 of bearing material thereby maintaining a pool of lubricant for the horizontal bearing surfaces between these elements. The excess lubricant flows out of drain outlets 200.

It is to be noted that a plurality of vent apertures 222 are disposed in the lower wall member 46 of the alignment coupling 16. These vent apertures are to prevent a static air pressure from developing within the lower sleeve member 46 which would prevent flooding of the gears 38 and 40 with lubricant.

With reference to the modified embodiment of the invention illustrated in FIGS. 6 through 9, component elements which are counterparts of the unit 8 described are identified with the same reference numbers with the addition of the suffix "a."

The integrated one-way torque unit 8a forming the modified embodiment of the invention referred to is so constructed that it can be readily adapted through selective assembly of its components, without structural modification of its parts, to transmit torque to the coacting vertical shaft 12a in either direction that is preselected.

In the construction of the unit 8a, the inner race 70a of the one-way torque coupling 14a is fabricated as an independent annular part, as shown in FIGS. 6 through 9, separate from the coupler 19a that is a common integral component of both the one-way torque coupling 14a and the alignment coupling 16a.

The outer periphery of the separately formed inner race 70a, which has a generally cylindrical annular shape over all, is fashioned, between its opposite ends, to define a cammed peripheral surface 96a shaped similarly to the cammed peripheral surface 96 on the inner race 70 of the previously described unit 8.

The lower end of the bottom portion 66a of the common coupler element 19a is externally shaped to define a cylindrical race support 230 dimensioned to fit into a cylindrical axial bore 232 defined within the separately formed race 70a.

At its opposite ends, FIGS. 1 and 9, the separately formed race 70a is shaped outwardly of the cammed peripheral surface 96 to define two narrow grooves 234, 236 opening outwardly to receive selectively a retaining ring 238 for supporting the roller assembly 72a, as will be presently described.

The annular race 70a is designed to be turned end for end and fitted onto the cylindrical support 230 on the coupler part 66a so that either end of the race 70a abuts against an annular shoulder 240 formed on the coupler part 66a at the alignment coupling end of the cylindrical support element 230.

The race 70a is precluded from turning on its cylindrical support 230 by one or more axial keys 242 fitted into aligned keyways 244, 246 formed in the inner periphery of the race 70a and the outer periphery of the cylindrical support 230 as illustrated in FIGS. 7 and 9. The upper end of the assembled race 70a is held in engagement with the annular abutment 240 on the coupler part 66a by a radial annular extension 248 on the lower end of the sleeve bearing 76a that fits within the lower portion of the part 66a and journals the spindle 74a. The sleeve bearing 76a is moved into place in the lower end of the part 66a and secured in place by small screws 250 which extend through the marginal edge of the radial annular extension 248 on the sleeve bearing and are threaded axially into the lower end of the cylindrical support part 230 for the inner race 70a as shown in FIG. 6. The annular bearing extension 248 is sufficiently large in diameter to radially overlap the lower end of the race 70a and hold the race and its driving key or keys 242 against axial dislodgement from their normal positions.

It may be noted here that the radial annular extension 248 on the sleeve bearing 76a is covered on its lower side with the layer of bearing material 78a and rest slidably on the generally flat annular bearing face 229a on the spindle 74 to support the common coupler 19a in the manner described previously in relation to the torque unit 8.

It will be noted with reference to FIGS. 7, 8 and 9 that the sloping roller support surfaces of the indentations 98a forming the cammed periphery 96a all have a common circumferential orientation in that such surfaces slope outward in the same circular direction as will be evident from the previous description of the unit 8. Moreover, it will be appreciated that the direction of orientation of the slope of the roller support surfaces of the indentations 98a determines the direction in which the unit will transmit torque to the coacting shaft 12a and conversely the rotary direction in which the unit will sustain, through the integrated couplings 14a and 16a, a torque reaction from the shaft 12a.

In the unit 8a, provision is made by means of the construction described for adapting the unit to transmit torque to the shaft 12 in either direction, which can be predetermined as desired by selective orientation of the race 70a as it is assembled onto its generally cylindrical support 230. By turning the race 70a end for end between a first position illustrated in solid lines in FIG. 9 and a second position illustrated in phantom in FIG. 9 and assembling the race in either one position or the other, the roller engaging surfaces of the indentations 98 may have either the orientation illustrated in FIG. 7 or the orientation illustrated in FIG. 8 with the consequence that the shaft 12a can be allowed to rotate freely in the particular direction desired and the unit 8a will function accordingly to sustain a torque reaction of the shaft 12a on the unit in the corresponding reverse direction.

As illustrated best in FIG. 8a, the cage assembly 72a is supported by a ring 250 having a vertical leg 252 directly supporting the cage assembly 72a and joining at its lower edge a thicker leg 254 extending radially inward into overlapping relation to the outer race 256 of a ball bearing 258 that is supported by the previously mentioned retaining ring 238 releasably fitted into the lower ring support groove 234.

In the event the inner race 70a is assembled in its inverted position to provide for free rotation of the shaft 12a in the opposite direction, the cage assembly 72a is supported in the same manner, the support ring 238 being lodged in this instance in the ring groove 236, FIG. 6, in the opposite end of the race 70a.

Continuous and adequate lubrication of the cage assembly 72a and coacting working surfaces on the outer race 68a and inner race 70a is assured for either of the two preselected assembly positions of the inner race 70a by means of one or more continuously fed lubricant discharging fountains 260 positioned as illustrated in FIG. 6 to pour lubricant through the annular space between the upper ends of the inner and outer races 70a, 68a onto the cage assembly 72a.

The fountain 260 is supported in a radial lubricant supply bore 262 extending radially through the annular wall of the common coupler part 66a into the annular chamber 210 that is continuously supplied with incoming lubricant through the bore 208a connected with a lubricant supply fitting 262 which also supplies lubricant to the supply line 204a.

The torque unit 8a not only functions to preclude reverse rotation of the shaft 12a in either direction as preselected by the orientation of the inner race 70a within the unit, but also provides for power driving of the shaft 12a through the unit 8a as this may be desirable. The transmission of torque through the unit 8a either to drive the shaft 12a or to effect driving by the shaft of structure located at the opposite end of the unit is provided by extending the spindle 74a upwardly through the center of the unit to connect, as shown in FIG. 6, with a drive coupling 264 that connects as illustrated with an auxiliary drive shaft 266.

The spindle 74, elongated to extend upwardly through the unit 8a as described, passes through the central passage 32a in the common coupler 19a, which is enlarged to provide clearance around the spindle 74a, and continues upwardly through an axial passage 268 formed centrally within the upper coupler 17a, the end of the spindle 74 connecting with the drive coupling 264 above the coupler 17a as shown.

Clearance between the upper coupler 17a and the lower coupler 19a for accommodation of the extended spindle 74a is provided by assembling between the upper and lower components 44a, 46a of the upper coupling sleeve 42a an annular ring 270 widely spaced radially from the spindle 74a.

In the unit 8a, the upper coupling sleeve 42a is supported on the oil collector 190a by means of a resilient ring 272 positioned between the lower edge of the sleeve 42a and the bottom wall 192a of the oil collector. In this instance, the oil collector bottom wall 192a is enlarged radially somewhat beyond the sleeve 42a and the cylindrical sidewall 194a of the collector is extended upwardly substantially to a flush relation to the upper end of the sleeve 42a with the consequence that lubricant cascading downwardly from the supply ports 180a enters the space between the sleeve 42a and the working parts of the upper coupling 16a which operate in a continuously refreshed lubricant bath maintained around the working parts of the upper coupling 16a by virtue of the capability of the upwardly extended oil collector 190a to contain oil up to the upper level of the working parts in the upper coupling.

The invention is claimed as follows:

1. A one-way, self-aligning torque unit comprising, in combination, an upper coupler member designed to sustain a torque reaction, an upper external gear on said upper coupler member, a lower coupler member disposed below said upper coupler member in generally coaxial relation thereto, a lower external gear on said lower coupler member, a sleeve encircling said upper and lower gears in axially spanning relation thereto and defining an internal upper gear and an internal lower gear meshing respectively with said upper and lower external gears to transmit torque therebetween while permitting movement of said lower external gear and said lower coupler member in relation to said upper coupler member to accommodate misalignment; a one-way torque coupling, inner race of annular form defining a circumferential series of roller support surfaces sloping outwardly in a common circumferential direction; said lower coupler member including means for supporting said annular race thereon in generally coaxial relation to said gears in either of two mounting positions, which positions are turned end for end in relation to each other so that the common slope of said roller supporting surfaces is selectively oriented circumferentially in either of two circumferential directions; a roller cage assembly encircling said inner race and including an annular series of rollers disposed around said inner race in confronting alignment with said respective surfaces, an outer race encircling said rollers, spring biasing means coacting with said cage assembly to urge said rollers into wedging relation between said outer race and said roller support surfaces to transmit torque therebetween in only one direction predetermined by the selected orientation in which said inner race is assembled onto said lower coupler member thereby precluding relative rotation of said races in said one direction while continuously permitting relative rotation of the races in the opposite direction, an antifriction bearing at the lower end of said inner race engaging said cage assembly to support the latter, means on each end of said inner race for supporting said antifriction bearing for either assembled position of said inner race on said lower coupler member, a spindle secured to said outer race for rotation therewith and extending upwardly axially through said lower coupler member and said upper coupler member, means forming a driving connection with the upper end of said spindle, an annular bearing mounted in said lower coupler member and journaling said spindle to maintain said outer race in concentric alignment with said inner race, and connecting means connected with said outer race for connecting the latter to a rotary part.

2. A one-way, self-aligning torque unit comprising, in combination, an upper coupler member designed to sustain a torque reaction, an upper external gear on said upper coupler member, a lower coupler member disposed below said upper coupler member in generally coaxial relation thereto, a lower external gear on said lower coupler member, a sleeve encircling said upper and lower gears in axially spanning relation thereto and defining an internal upper gear and an internal lower gear meshing respectively with said upper and lower external gears to transmit torque therebetween while permitting movement of said lower external gear and said lower coupler member in relation to said upper coupler member to accommodate misalignment; a one-way torque coupling, inner race of annular form defining a circumferential series of roller support surfaces sloping outwardly in a common circumferential direction, said lower coupler member including means supporting said annular race thereon in generally coaxial relation to said gears, a roller cage assembly encircling said inner race and including an annular series of rollers disposed around said inner race in confronting alignment with said respective surfaces, an outer race encircling said rollers, spring biasing means coacting with said cage assembly to urge said rollers into wedging relation between said outer race and said roller support surfaces to transmit torque therebetween in only one direction thereby precluding relative rotation of said races in said one direction while continuously permitting relative rotation of the races in the opposite direction, an antifriction bearing at the lower end of said inner race engaging said cage assembly to support the latter, means on each end of said inner race for supporting said antifriction bearing, a spindle secured to said outer race for rotation therewith and extending upwardly axially through said lower coupler member and said upper coupler member, means forming a driving connection with the upper end of said spindle, an annular bearing mounted in said lower coupler member and journaling said spindle to maintain said outer race in concentric alignment with said inner race, and connecting means connected with said outer race for connecting the latter to a rotary part.

3. A one-way, self-aligning torque unit comprising, in combination, an upper coupler member designed to sustain a torque reaction, an upper external gear on said upper coupler member, a lower coupler member disposed below said upper coupler member in generally coaxial relation thereto, a lower external gear on said lower coupler member, a sleeve encircling said upper and lower gears in axially spanning relation thereto and defining an internal upper gear and an internal lower gear meshing respectively with said upper and lower external gears to transmit torque therebetween while permitting movement of said lower external gear and said lower coupler member in relation to said upper coupler member to accommodate misalignment; a one-way torque coupling, inner race of annular form defining a circumferential series of roller support surfaces sloping outwardly in a common circumferential direction; said lower coupler member including means for supporting said annular race thereon in generally coaxial relation to said gears in either of two mounting positions, which positions are turned end for end in relation to each other so that the common slope of said roller supporting surfaces is selectively oriented circumferentially in either of two circumferential directions; a roller cage assembly encircling said inner race and including an annular series of rollers disposed around said inner race in confronting alignment with said respective surfaces, an outer race encircling said rollers, spring biasing means coacting with said cage assembly to urge said rollers into wedging relation between said outer race and said roller support surfaces to transmit torque therebetween in only one direction predetermined by the selected orientation in which said inner race is assembled onto said lower coupler member thereby precluding relative rotation of said races in said one direction while continuously permitting relative rotation of the races in the opposite direction, a spindle secured to said outer race for rotation therewith and extending upwardly axially through said lower coupler member and said upper coupler member, means forming a driving connection with the upper end of said spindle, an annular bearing mounted in said lower coupler member and journaling said spindle to maintain said outer race in concentric alignment with said inner race, and connecting means connected with said outer race for connecting the latter to a rotary part.

* * * * *

PO-1050
(5/69)

UNITED STATES PATENT OFFICE
CERTIFICATE OF CORRECTION

Patent No. 3,633,713　　　　　　　　　　Dated　January 11, 1972

Inventor(s)　Joseph A. Marland and Charles W. Hill

It is certified that error appears in the above-identified patent and that said Letters Patent are hereby corrected as shown below:

Abstract, line 7, change "coating" to --coacting--

Col. 1, line 22, after "and" change "as" to --at--

Col. 1, line 47, change "laterally" to --literally--

Col. 5, line 66, change "tope" to --top--

Signed and sealed this 28th day of November 1972.

(SEAL)
Attest:

EDWARD M. FLETCHER, JR.　　　　　　　　　　ROBERT GOTTSCHALK
Attesting Officer　　　　　　　　　　　　　Commissioner of Patents